Oct. 16, 1934.    A. McL. NICOLSON    1,977,198
AERIAL NAVIGATIONAL SIGNALING SYSTEM
Filed June 28, 1930    3 Sheets-Sheet 1
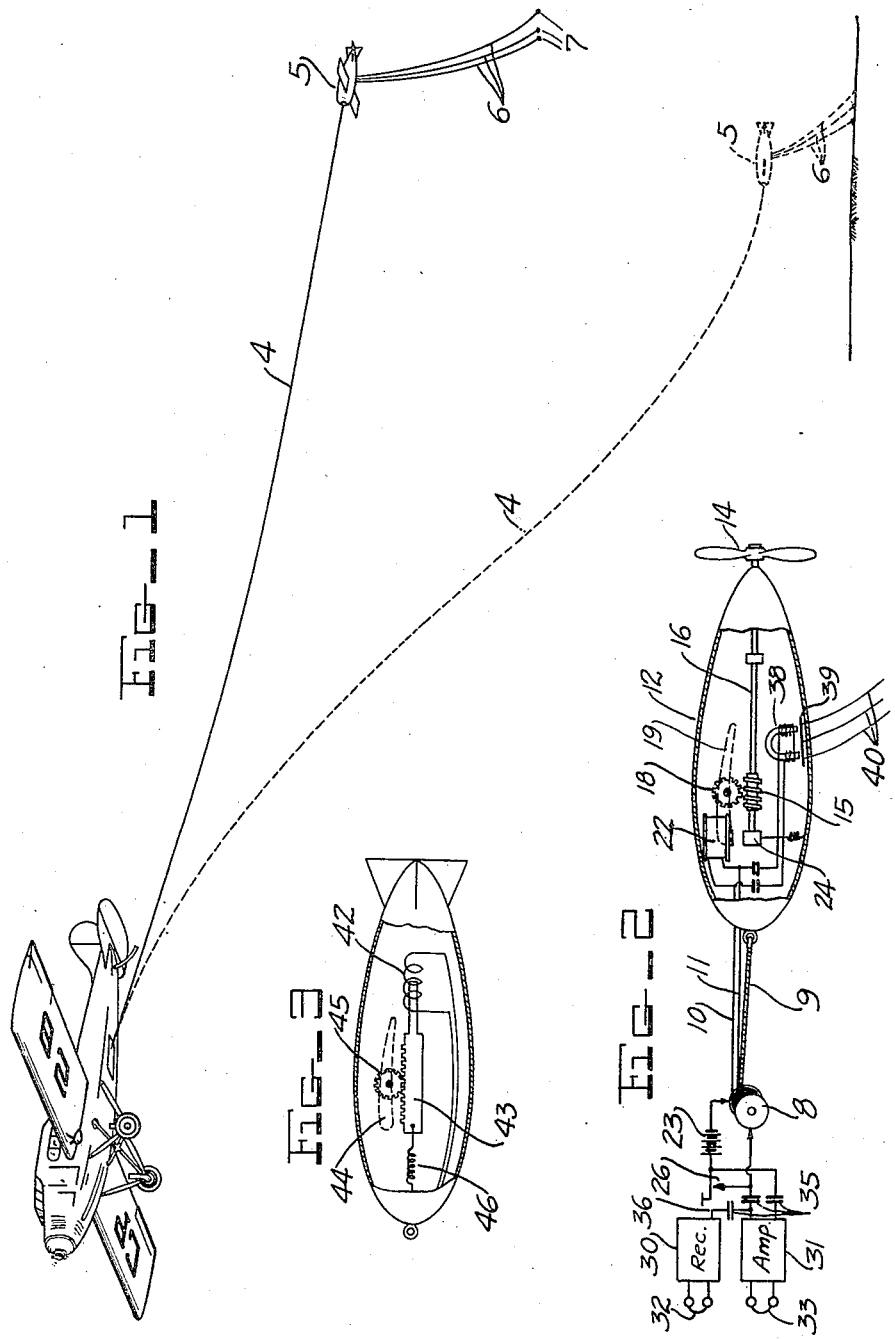
INVENTOR
Alexander McLean Nicolson.
BY
ATTORNEY Oct. 16, 1934.   A. McL. NICOLSON   1,977,198
AERIAL NAVIGATIONAL SIGNALING SYSTEM
Filed June 28, 1930   3 Sheets-Sheet 2
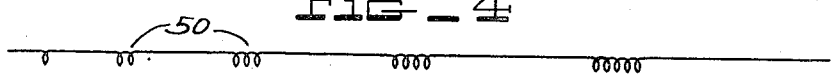
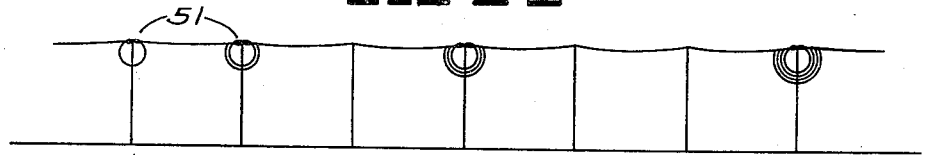
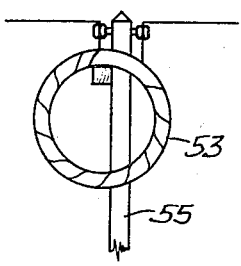
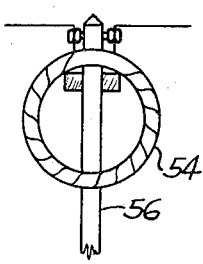
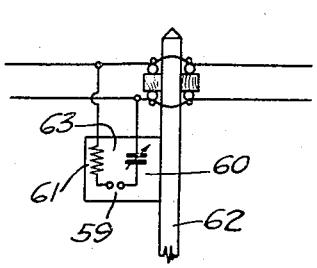
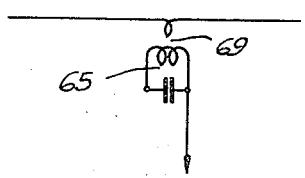
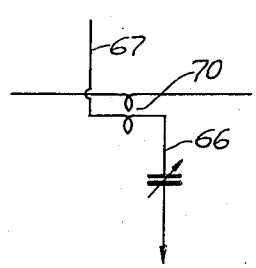
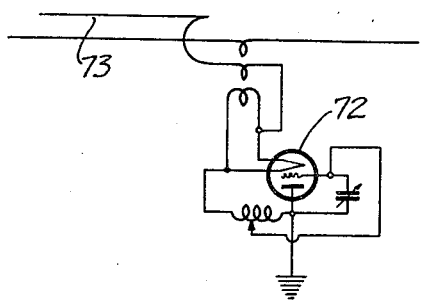
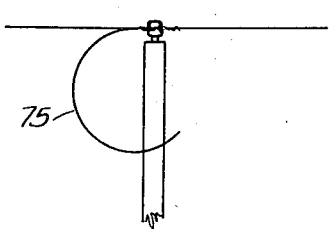
INVENTOR
*Alexander McLean Nicolson*
BY
ATTORNEY Oct. 16, 1934. A. McL. NICOLSON 1,977,198
AERIAL NAVIGATIONAL SIGNALING SYSTEM
Filed June 28, 1930   3 Sheets-Sheet 3
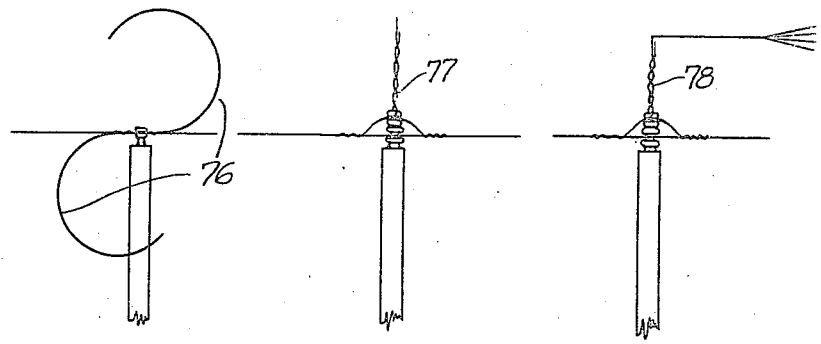
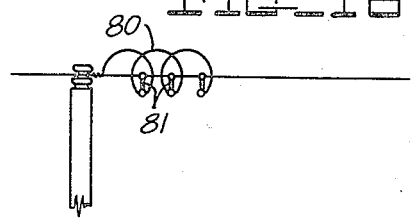
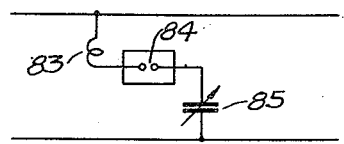
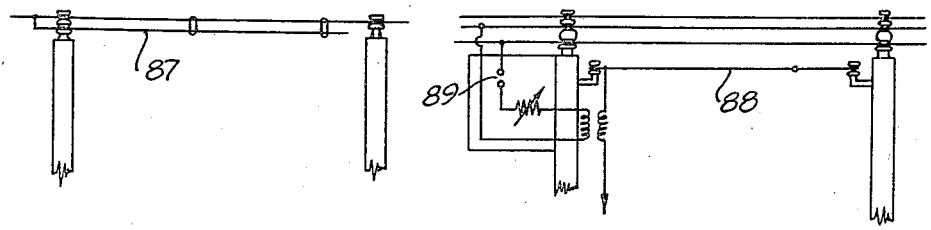
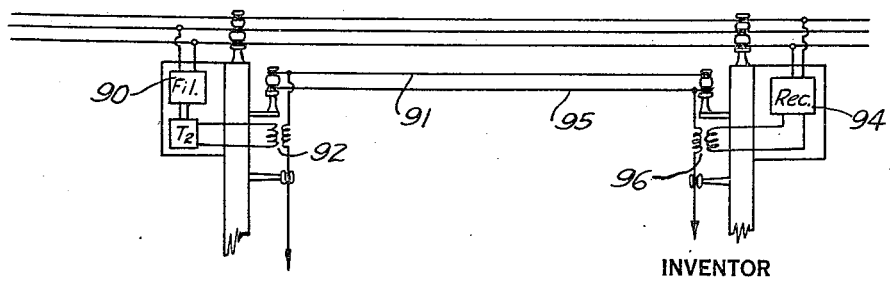
INVENTOR
*Alexander McLean Nicolson.*
BY
ATTORNEY Patented Oct. 16, 1934

1,977,198

UNITED STATES PATENT OFFICE 1,977,198

AERIAL NAVIGATIONAL SIGNALING SYSTEM

Alexander McLean Nicolson, New York, N. Y., assignor to Communication Patents, Inc., New York, N. Y., a corporation of Delaware Application June 28, 1930, Serial No. 464,480

18 Claims. (Cl. 177—352)

This invention relates to electrical signaling systems, and particularly to a method of and means for signaling from ground to aircraft in flight, and between aircraft and land stations.

An object of this invention is to enable aircraft in flight to determine its geographical position when the vision of the pilot is obscured.

Another object of the invention is to enable aircraft to determine its altitude position during periods of low or non-visibility.

Another object of the invention is to transmit characterized signals to enable aircraft to determine its position at any time during flight.

For night flying or for aerial navigation during fogs, clouds and the like, it is extremely desirable to have means for determining the exact position of the aircraft, both as to altitude and location. It is especially desirable to determine whether or not aircraft is over land or water, also the nature of the land over which it is flying, such as mountainous regions, forest or prairie sections. The present invention enables a pilot to determine his position with respect to any particular landing field, and permits him to follow a pre-arranged course during non-visibility, and to adjust his altitude of flight so as not to come in contact with power lines, mountains or high buildings.

A particular feature of this invention is the use of a trailing antenna, which may be adjusted with respect to the sending stations during flight to obtain directional effects. The ability to adjust a long trailing antenna enables an observer to determine, not only the direction of the signals being received, but to distinguish between certain types of signals being transmitted. The antenna is adjusted by means of a trailer plane or kite.

This invention contemplates the transmission of characteristic signals, such as variations in amplitude and variations in frequencies at certain strategic broadcast points. A certain definite area on the ground may transmit various signals characterized by frequency and amplitude, so that by varying the adjustment of the aerial by the aircraft observer, the pilot may determine his position and be directed along a safe course both as to height above ground and direction of flight.

To distinguish between the land surface such as land and water, trees and plain, a microphone is provided in the small trailing kite or plane, to the diaphragm of which is attached long feeler wires of varying lengths, which are adapted to drag along the ground surface. The frictional signals produced in the wires are characteristic of the material over which the feelers are passing, the signals being transmitted to the observer in the plane for differentiation. For instance, when the plane is passing over water, a definite characteristic sound is transmitted by the microphone to the receivers, while an entirely different characterized sound is obtained when the feelers are passing or dragging over a surface comprised of stones or trees. A small amount of practice in observing the characteristics of the sounds when the objects producing them are known, will soon permit an observer to immediately determine the character of the surface over which he is passing. The trailing plane may be drawn into the main aircraft when not required.

The invention will be more fully understood by reference to the accompanying drawings, in which:

Figure 1 is a perspective view of one embodiment of the invention;

Fig. 2 is a cross-sectional view of a trailing plane with its interior mechanism and external circuits;

Fig. 3 is a modification of the plane of Fig. 2.

Figs. 4 and 5 show means for transmitting characterized signals along a transmission line;

Figs. 6 to 19, inclusive, show various types of means which may be distributed along high power transmission lines or independent systems for the transmission of characterized signals over definite areas; and Fig. 20 is a circuit drawing of a transmitting and receiving system for use with a power transmission system.

Referring specifically to Fig. 1; an aeroplane in flight has a trailing kite or plane 5 attached thereto by a cable 4, while the plane 5 has feeler antennæ 6 hanging from its lower side. The solid and dotted line drawings indicate two positions which the trailing plane may have with the aeroplane in the same position. In the second or dotted line position, it is observed that the feeler antennæ are in contact with the earth, for transmitting to an observer in the plane the nature of the land over which the antennæ are being drawn.

Referring to Fig. 2, a cross-section of one form of trailer is shown with its adjusting cable and control circuits. The plane 12 may be drawn up into the aeroplane by means of a sheave 8 and a cable 9. Parallel with the sheave 9 are transmission wires 10 and 11, which may be connected to slip rings mounted on the sheave for the transmission of energy from and to the kite plane in any well known manner. The wires 10 and 11 may also be enclosed within the cable 9, or they may be of such size that they serve as a cable.

The plane 12 is equipped with a wind mill propeller 14 which drives a screw 15 located near the terminal of a drive shaft 16 when being drawn through the air by the main aircraft. Normally, the screw is out of contact with a gear 18 which is fastened to a wing 19 which may be tilted by the turning of the gear. That is, when the wing is tilted downwards, the trailing plane will take the position shown by the dotted line sketch in Fig. 1, and if tilted backward, will take the position shown by the solid line sketch. The power for tilting the plane is obtained by the propeller 14. The worm 15 is meshed with the gear 18 by energizing a coil 22 over conductors 10 and 11 from a source of current 23 located in the plane. In fact all the apparatus is permanently located in the main craft with the exception of the trailer and connecting wires. Upon energization of the coil, a magnetic armature 24 is raised meshing the gears and tilting the wing forward, which forces the aeroplane to a lower level. A key 26 controls the energization of the coil 22. The key 26 may remain closed and when the wing has reached its tilting limit, it will stop the propeller 14, as the propeller generates slightly more than sufficient power to drive the wing forward. The wing will be maintained in the forward position by the propeller thrust. When it is desired to raise the trailer to an upper level comparable to that of the main craft, the key 26 is opened, the worm is released from the gear 18, and the force of the air passing the trailer will lift the wing 19, and force it backward to a limiting position, which will raise the trailer.

Located in the main plane is a receiver 30 and an amplifier 31, each of which is provided with head phones 32 and 33, respectively, connected to the lines 10 and 11 through blocking condensers 35. These units may actually comprise a single receiving system with switches for switching the single wire input line 36 to the double wire input. In the present embodiment, amplifier 31 is employed to amplify signals from a microphone or pick-up 38 located in the trailing plane, the microphone having a diaphragm 39 to which is connected trailing or feeler wires 40 represented by 6 in Fig. 1. Frictional vibrations generated in the wires 40 are changed into electrical vibrations by the microphone 38, and are transmitted over the wires 10 and 11, to amplifier 31 for detection. The wires 40 may be terminated in metal discs 7, to increase the efficiency and to act as sinkers for the feeler wires. The receiver 30 is connected to either one of the conductors 10 and 11, which serve as the antenna for picking up transmitted signals from land or aircraft radiating stations.

In Fig. 3 another means of adjusting the plane to take different altitudes of flight with respect to the main plane is shown. In this modification no wind mill propeller is required, since a coil 42 operates a rack 43 to tilt a wing 44 associated with a gear 45. A spring 46 may revert the wing to its opposite position, or the action of the passing air may perform this function. The coil 42 may be energized from a source of power within the plane over the connecting wires, as shown in Fig. 2.

During operation of the receiver to detect certain signals being transmitted along the route, the kite plane is raised or lowered to determine the relative strength of signals being received. At the same time, the feelers are brought in contact with the land or water, as the case may be, and the determination of the nature thereof is made. During periods of visibility, the trailer may be brought into the aeroplane by winding the cable 9 on the sheave 8. Even in cases of visibility, it may be desirable to transmit or receive communication signals from the plane, and this may be readily accomplished by dropping the antenna. During these periods the trailer may be adjusted to a position to receive maximum signal strength of radiation in the case of transmitting.

The broadcasting of signals to an aeroplane in flight may be accomplished by placing high frequency on power lines, or on lines strung especially for the purpose. In Fig. 4, the method shown is by placing various numbers of turns 50 either in the power transmission conductors themselves, or in special antennæ circuits, while Fig. 5 shows another arrangement of turns 51 in such lines. The various turns are placed at unequal intervals along the lines, the arrangement of different strength radiations in a particular pattern, characterizing a definite geographical area. The pilot or observer in the aircraft having previous knowledge of the characterizations of areas according to their location, will be enabled to immediately know his position. The signals may be high frequency currents superimposed upon the power line currents, and may be characterized in various ways such as by continuous waves or impulses in a definite order.

Figs. 6 and 7 show means for mounting coils 53 and 54 on transmission poles, 55 and 56, respectively, for radiating the high frequency signaling currents. These coils may be placed in a plane perpendicular to the surface of the earth, or in a plane parallel therewith.

Fig. 8 shows means for producing a characteristic frequency radiation by having an arc or spark gap 59 in series with a variable condenser 60 and resistance 61 connected across the power conductors for the purpose of tuning the arc to a particular harmonic produced by it, which will be radiated by the line conductors. This unit may be mounted on a power line pole or mast 62 in a casing 63. In this instance no high frequency is required superimposed upon the power current, as the power current itself may be utilized to produce said discharge at said gap 59.

Figs. 9 and 10 show means for radiating high frequency currents transmitted over the line by use of tuned circuits 65 and 66, which may be connected to ground and have a vertical aerial 67, as shown in Fig. 10. These units may be distributed along the line, as disclosed in Figs. 4 and 5, for producing various amplitudes, the units receiving their energy from high frequency transformers 69 and 70.

In Fig. 11 an oscillator 72 supplied from the current transmitted along the line produces a characteristic frequency which is broadcast by its antenna 73. A series of such oscillator systems may be distributed at unequal intervals for giving a definite characterized radiation over a certain area. Each oscillator may provide a radiation which is different from any other both as to frequency and amplitude.

Figs. 12, 13, 14, 15 and 16 show various types of radiating antennæ for high frequency currents transmitted over telephone conductors. As these systems are fed from the power line itself, they broadcast energy at a constant frequency, but may be adjusted to provide varying amplitudes. Fig. 12 shows a single loop 75, while Fig. 13 shows a double loop 76. Fig. 14 shows a twisted vertical antenna 77, while the vertical system 78 of Fig. 15 is formed into an L type arrangement. Fig. 16 has an elongated coil 80 positioned around the power line conductor and insulated therefrom by insulators 81.

Fig. 17 shows a characterized radiating point similar to the one of Fig. 8, but which has a tuning coil 83 in series with a gap 84, and condenser 85 for obtaining sharper tuning of a harmonic of the discharge across the gap.

Figs. 18 and 19 show auxiliary antenna systems 87 and 88 paralleling the power line, to obtain stronger radiation than that obtainable from the power lines alone. These auxiliary wires may be of varying lengths, to obtain a varying amplitude characteristic, while the gap 89 may generate different radiating frequencies for broadcasting by the antenna 88.

The above disclosed transmitting systems are especially applicable to field characterizations involving transmission in only one direction. The circuit shown in Fig. 20, however, is of a transmitter T2, energized from the power lines, and used for broadcasting definite communication signals to aircraft. A filter 90 is employed to permit only the power frequency being supplied to the transmitter, which may be of any well known type. The transmitter employs antenna 91 fed through a transformer 92. An associate receiver system 94 receives both its power and signaling currents originating from aircraft in flight from the power lines. The signaling currents being transmitted from the receiver may also be used for re-broadcasting, using a separate antenna 95 coupled to the receiver 94 through a transformer 96, and in that way serve as a relay system. The antenna 95 may also be used as the receiving antenna. With such transmitting and receiving apparatus located at various points along a power line, continuous or intermittent communication may be had with aircraft to inform pilots of their course, and provide them with information as to weather conditions to be encountered. This communication apparatus may be entirely supplied from the power circuits traversing the country, providing a simple solution for maintaining such apparatus at regular intervals over definite routes. The transmitting apparatus disclosed above is being claimed in co-pending application Serial No. 554,967, filed August 4, 1931.

It will be obvious to those skilled in the art that many modifications may be made in the systems and apparatus above disclosed, but it is to be understood that such modifications are contemplated to be within the scope of the appended claims.

What is claimed is:

1. In an aerial navigation system, an airship having signal receiving apparatus therein, an antenna for said apparatus adapted to be trailed from said airship, means within said airship for varying the length of said antenna, and means controlled from said airship for adjusting said antenna with respect to the surface of the earth.

2. In an aerial navigation system, an airship having an electrical receiving apparatus therein, a trailing antenna for said apparatus in moving contact with the earth's surface, means for translating the contact vibrations into characterized electrical currents, means removed from said airship for adjusting the altitude of the trailing end of said antenna with respect to the earth, and means in said airship for controlling the adjustment of said antenna.

3. In an aerial navigation system, an airship having electrical receiving apparatus therein, a moving antenna between said airship and the earth, means connected to said antenna for transforming frictional vibrations in accordance with the nature of the surface of the earth over which said airship is passing into electrical currents, means for transmitting said currents to said apparatus, and means for adjusting said transforming means with respect to its height above the earth.

4. In an aerial navigation system, an aircraft, an electrical receiving apparatus in said aircraft, a microphone on said aircraft for translating contact vibrations into characterized electrical currents, and an antenna attached to said microphone for producing vibrations, said vibrations being obtained and characterized by the contact of said means with the surface of the earth over which said aircraft is passing.

5. In an aerial navigation system, an aircraft, an electrical receiving apparatus located in said aircraft, a trailing antenna system for said apparatus adjustable from said aircraft, means for inducing in said antenna characterized signals in accordance with the nature of the surface of the earth, means for translating said signals into corresponding electrical signals, and means for transmitting said last-mentioned signals to said apparatus.

6. An aerial navigation system in accordance with claim 5 in which said last-mentioned means includes means attached to the end of said antenna for contacting with the surface of the earth.

7. In an aerial navigation system, an airship, a trailing plane having a microphone therein, means for making contact between the earth and said microphone, said microphone translating the contact vibrations into characterized electrical currents, a cable connecting said airship and said trailing plane, said cable connecting said microphone and said amplifier, wings attached to said trailing plane, and means within said trailing plane for adjusting said wings to control its position of flight with respect to said airship.

8. An aerial navigation system in accordance with claim 7, in which said last-mentioned means includes mechanism driven from a propeller rotated by the forward movement of said trailing plane controlled from said airship.

9. In an aerial navigation system, an airship, an auxiliary plane trailing said airship and attached thereto, means adjusted by said auxiliary plane for making contact with the earth's surface, means within said auxiliary plane for translating contact vibrations into characterized electrical currents, and means for transmitting said currents to said airship.

10. In an aerial navigation system, an airship, a trailing plane attached to said airship, a detector in said trailing plane, feeler wires connected to said detector, said detector translating the vibrations in said feeler wires into electrical currents, characterized by the nature of the earth's surface, means for controlling the altitude of flight of said trailing plane, and means for transmitting the output of said detector from said trailing plane to said airship during flight.

11. In an aerial navigation system, an airship having signal receiving apparatus therein, an antenna for said apparatus adapted to be trailed from said airship, means within said airship for varying the length of said antenna, and means at the terminal of said antenna for adjusting its relationship with respect to the surface of the earth.

12. In an aerial navigation system, an airship having a plurality of signal receivers therein, a plurality of antennæ adapted to be trailed from said airship, means within said airship for varying the length of one of said antennæ, means at the terminal of one of said antennæ for varying the position of both of said antennæ with respect to the earth, and means for translating contact vibrations produced in the second of said antennæ into electrical currents to be conducted along said first antenna to said airship.

13. In an aerial navigation system, an airship having signal receiving apparatus therein, an antenna for said apparatus adapted to be trailed from said airship, and means controlled from said airship for adjusting the terminal of said antenna with respect to the surface of the earth.

14. In combination, means for translating vibrations into electrical currents, means for transforming said currents into audible sound, and means connected to said vibration translator for contacting with different substances, the vibrations produced by said contact being characterized by the surfaces of said substances.

15. In combination, a microphone for translating mechanical vibrations into electrical currents, means for varying the magnetic circuit of said microphone, means connected to said microphone for translating said currents into audible sounds, and means connected to said means for varying the magnetic current for creating mechanical vibrations characterized by the surface in contact with said means.

16. In combination, a microphone having a diaphragm, and a flexible antenna connected to said diaphragm for actuating said diaphragm by vibrations induced in said antenna.

17. In combination, an electrical signal detector, means for translating mechanical vibrations into electrical current connected to the input of said detector, and means for making direct contact between said last-mentioned means and substances to be determined.

18. In combination, a microphone comprising a vibrating element, the vibrations of which set up electrical currents corresponding to said vibrations, and flexible means attached to said element for vibrating said element.

ALEXANDER McLEAN NICOLSON.